United States Patent
Adar et al.

(10) Patent No.: US 7,464,008 B2
(45) Date of Patent: Dec. 9, 2008

(54) METHODS AND APPARATUS FOR SELECTING EVENT SEQUENCES BASED ON A LIKELIHOOD OF A USER COMPLETING EACH EVENT SEQUENCE

(75) Inventors: Michel Adar, Palo Alto, CA (US); Sergey A. Prigogin, Foster City, CA (US); Nicolas M. Bonnet, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 389 days.

(21) Appl. No.: 11/000,570

(22) Filed: Nov. 30, 2004

(65) Prior Publication Data

US 2005/0165596 A1    Jul. 28, 2005

Related U.S. Application Data

(60) Provisional application No. 60/539,831, filed on Jan. 27, 2004.

(51) Int. Cl.
*G06F 7/60* (2006.01)

(52) U.S. Cl. .......................................... 703/2

(58) Field of Classification Search ........................ 703/2
See application file for complete search history.

(56) References Cited

U.S. PATENT DOCUMENTS

2004/0249867 A1 * 12/2004 Kraiss et al. ................ 707/203

* cited by examiner

*Primary Examiner*—Hugh Jones
(74) *Attorney, Agent, or Firm*—Townsend and Townsend and Crew LLP

(57) ABSTRACT

An expected value associated with an end event is predicted for each of multiple event sequences, with an event sequence to be presented to a user being selected based on the excepted values. In one embodiment, input attributes and contextual data collected during performance of previous event sequences are obtained, and a plurality of expected values is predicted for going from a first event to each of a plurality of subsequent events of a first event sequence. An expected value is also predicted for going from a first event of a second event sequence to an end event of the second event sequence. The expected values for the first and second event sequences are compared to determine which end event a user is more likely to reach, and an event sequence is selected to present to a user based thereon.

31 Claims, 8 Drawing Sheets

US 7,464,008 B2

METHODS AND APPARATUS FOR SELECTING EVENT SEQUENCES BASED ON A LIKELIHOOD OF A USER COMPLETING EACH EVENT SEQUENCE

CROSS REFERENCE TO RELATED PATENT APPLICATION

This application claims priority of U.S. Provisional Patent Application No. 60/539,831, entitled "COMPUTING EXPECTED VALUES IN THE PRESENCE OF UNCERTAINTY", filed 27 Jan. 2004 by Michel Adar et al., which application is incorporated herein by reference in its entirety for all purposes. This application is related to co-pending (1) U.S. patent application Ser. No. 10/980,421, entitled "METHOD AND APPARATUS FOR AUTOMATICALLY AND CONTINUOUSLY PRUNING PREDICTION MODELS IN REAL TIME BASED ON DATA MINING", filed 2 Nov. 2004 by Sergey A. Prigogin et al. and (2) U.S. patent application Ser. No. 10/980,440entitled "METHOD AND APPARATUS FOR OPTIMIZING THE RESULTS PRODUCED BY A PREDICTION MODEL" filed 2 Nov. 2004 by Michel Adar et al. These applications are incorporated herein by reference in their entirety for all purposes.

BACKGROUND OF THE INVENTION

The present invention relates to the general technical area of modeling interactions between various entities, such as a customer and a telephone call center. More specifically, it relates to modeling interactions to determine expected values (e.g., probability values) for reaching an end event in the presence of uncertainty.

Consumers of products and services are increasingly using automated interaction channels such as Internet web sites and telephone call centers. Such automated sales channels typically provide an automated process which attempts to match potential customers with desirable products and/or services. In the case of web sites, the interaction channel may be fully automated. In the case of call centers, human customer-service agents are often used. One goal of the companies selling the products and services is to maximize total enterprise profitability and, therefore, companies will often invest heavily in creating computerized models in an attempt to maximize their revenue and minimize their expenses for both of these types of sales channels.

Prediction modeling is generally used to predict the outcome of numerous decisions which could be implemented. In a most simplistic example, a prediction model may predict the likelihood (or probability) of a particular result or outcome occurring if a particular action was performed (e.g., a particular decision is carried out) under one or more specific conditions. In a more complex scenario, a prediction model may predict the probabilities of a plurality of outcomes for a plurality of actions being performed under various conditions.

In a specific application, prediction modeling may be used to decide which specific interactions are to be taken by a company's service or product sales center (e.g., website or telephone call center) when a customer is interacting with such center. The prediction modeling helps the company select an interaction that is likely to result in a desirable goal being met. Automated sales centers, for example, typically provide an automated process which attempts to match potential or current customers with desirable products and/or services. In the case of websites, the sales center may be fully automated. In the case of call centers, human customer-service agents in conjunction with automated interactive voice recognition (IVR) processes or agents are often used.

For example, a customer may go to a particular website or call center of a company which specializes in selling automobiles. From the company's perspective, the company may have a goal of maximizing automobile revenue to each customer who interacts with its website or telephone call center. When a customer initially accesses the website or call center, it may be possible to select any number of sales promotions to present to the customer (e.g., via a web page or communicated by a human sales agent). Prediction models may be used to determine which sale promotion to present to a given customer to more likely achieve the goal of maximizing sales revenue. For instance, it may be determined that a particular type of customer is highly likely to buy a particular type of automobile if presented with a sales presentation for such item.

Typically, customers take actions to move through a series of events which define a particular "pipeline." For example, a customer may first view a product on a web page, then add the viewed web product to their shopping cart, and finally purchase the product. While companies have realized that their goal or goals (e.g., maximizing revenue) are dependent upon these pipelines, conventional methodologies for determining expected values (such as the probability of a potential customer purchasing an offered product) have been inadequate. Additionally, even when data is collected over time to determine an end goal's expected value, such as the probability of purchasing a product via a particular pipeline, another pipeline end goal's expected value may not have enough data collected to ensure the reliability of a prediction calculation based on such collected data. In other words, prediction methodologies are inadequate in the presence of uncertainty.

In view of the above, there is a need for improved mechanisms for affectively using prediction models to determine the expected value of end goals for a pipeline scenario in the presence of uncertainty.

SUMMARY OF THE INVENTION

Accordingly, methods and apparatus for determining an expected value for an end event of an event sequence in the presence of uncertainty is disclosed. In general, embodiments of the present invention allow an expected value to be estimated for an end event in a particular event sequence in the presence of uncertainty by calculating expected values for another event sequence for which there is a higher degree of certainty. A first stage of the procedure for estimating an expected value may include using a wider range of event sequences as well as a set of current input attributes, such as the current customer profile. A second stage of the procedure may alternatively be applied when this first stage is determined to be uncertain. The second stage may include determining expected values for a wider range of customer profiles and the same event sequence (or a set of other event sequences) and then using these expected values to estimate the expected value for end event of the uncertain event sequence. This multiple stage process allows the estimated event sequence to more accurately be determined in a first phase and alternatively more roughly determined in a second stage if there is not enough data for the first stage determination phase.

In one embodiment, a method of predicting an expected value associated with an end event of an event sequence is disclosed. The method includes the following operations: (a) providing a current set of input attributes and contextual data collected during performance of previous event sequences;

(b) predicting a plurality of expected values for going from a first event of a known event sequence to each of a plurality of subsequent events of the known event sequence based at least on the current set of input attributes and the collected contextual data; and (c) predicting an expected value for going from a first event of an unknown event sequence to an end event of such unknown event sequence based on at least two of the expected values predicted for the known event sequence and based at least on the current set of input attributes and the collected contextual data. The expected value for reaching the end goal of the unknown event sequence cannot be determined with a degree of certainty that is higher than a predetermined value, and the expected value for reaching the end goal of the known event sequence can be determined with a degree of certainty that is higher than the predetermined value.

In a specific implementation, the method further includes (e) determining whether there is enough contextual data to predict the plurality of expected values for the known event sequence based on the current set of input attributes and no other input attributes and based on the collected contextual data with a degree of certainty that is higher than a predetermined value or a degree of uncertainty that is lower than a predetermined value. Predicting the plurality of expected values for the known event sequence is based on the current set of input attributes and no other input attributes when operation (e) is true, and predicting the plurality of expected values for the known event sequence is based on other sets of input attributes from the collected contextual data when operation (e) is false.

In one aspect, the expected values are probability values. In another aspect, the known event sequence is a compilation of known event sequences that are similar to the unknown event sequence and the unknown event sequence when operation (e) is true. In yet a further aspect, the known event sequence is equal to the unknown event sequence when operation (e) is false. In another embodiment, the other sets of input attributes are all of the input attributes from the collected contextual data. In one embodiment, each of the event sequences include steps going from a first step of presenting one or more particular offers for a product and an end step of using the offered product.

In one implementation, the current set of input attributes and the other sets of input attributes each are in the form of a profile of a potential customer. In one aspect, the profile includes one or more of the following parameters: prior experience with the potential customer, how the potential customer reached the company's home page, and the time of day. The prior experience with the potential customer may include information selected from one or more of the following: an income value or range, an age or age range, a gender, a residential address, purchasing history, and whether the potential customer owns a home or rents.

In a specific embodiment, operation (c) is performed by setting the expected value for going from the first event to the end event of the unknown event sequence equal to a percentage jump between the last event and a second to the last event of the known event sequence multiplied by an expected value for a second to the last step of the unknown event sequence.

In another embodiment, the invention pertains to a computer system operable to predict an expected value associated with an end event of an event sequence. The computer system includes one or more processors and one or more memory. At least one of the memory and processors are adapted to provide at least some of the above described method operations. In yet a further embodiment, the invention pertains to a computer program product for predicting an expected value associated with an end event of an event sequence. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures that illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
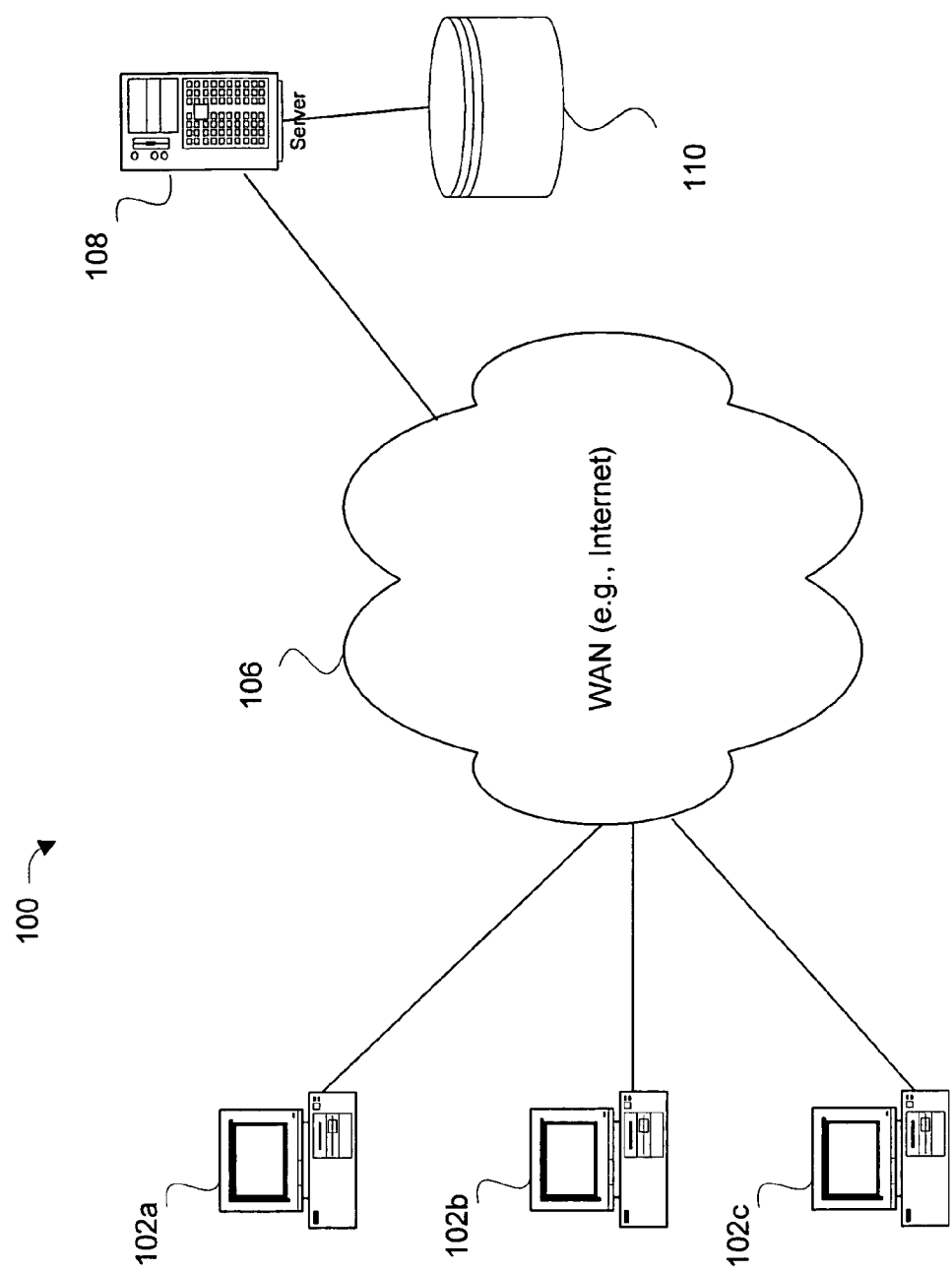
FIG. 1 is a diagrammatic representation of an exemplary first sales channel for which techniques of the present invention may be applied.

FIG. 1 is a diagrammatic representation of an exemplary first sales channel 100 for which techniques of the present invention may be applied. As shown, the sales channel 100 includes a plurality of hosts 102 and a web server 108 which are both coupled to a wide area network (WAN) 106, e.g., the Internet. Any suitable type of entity or user (such as a person or an automated process) may access the web server 108 via host device 102. The server 108 may also be in communication with one or more database 110. The web server 108 may be configured to provide various products and services to various users. For example, the web server 108 may include an on-line store for customers to purchase various products and an on-line service center for providing customers with FAQ's or trouble shooting help regarding their purchased products.

In a sales environment, potential customers on computers 102 or the like access the web server 108 via the Internet 106 or the like. Their experience at the website hosted by web server 108 is dictated or influenced by one or more prediction models running, for example, on the web server 108 and obtained from database 110, for example. The prediction model is preferably self-learning, at least based in part, on the interactions of the potential customers and the website. Information regarding the customers and website interactions is preferably stored in database 110. It should be noted that the computers, network, servers, databases, machines, etc. that are illustrated in FIG. 1 are logical in nature, and some are all of their functionalities can be performed on one or more physical machines, systems, media, etc.

Figure 2:
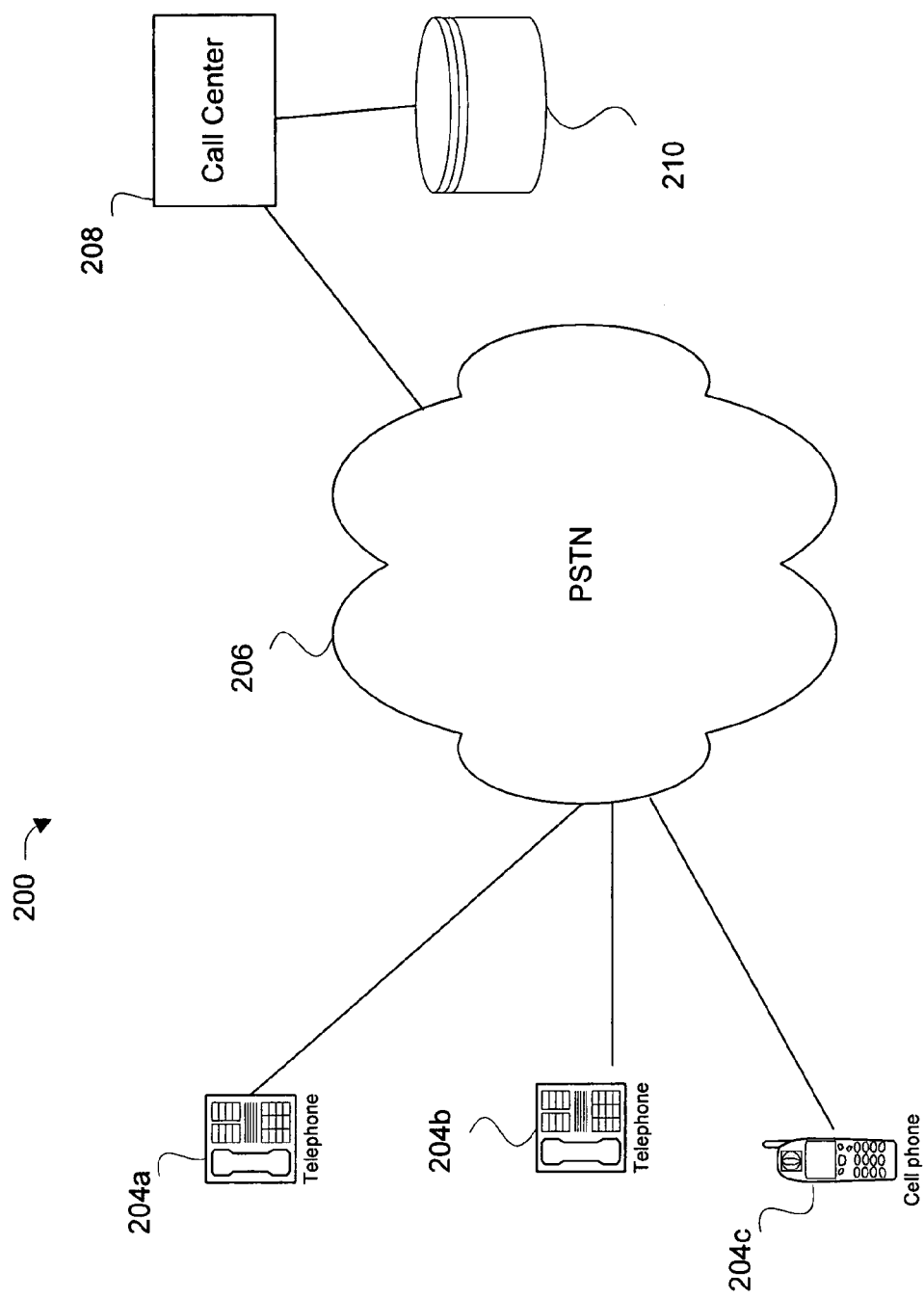
FIG. 2 is a diagrammatic representation of an exemplary second sales channel for which techniques of the present invention may be applied.

FIG. 2 illustrates an exemplary second sales channel 24 which has certain analogies with the exemplary first sales channel 100. In second sales channel 200, users may access call center 208 though individual telephones 204 or the like via a telephone system 206 (public switched telephone network or PSTN) or the like. The call center 208 may maintain a database 210 for essentially the same purposes that the web server 108 of FIG. 1 maintains the database 110 in the first sales channel 100. Users may communicate and interact with agents (human or automated) or an IVR system at the call center 108. Again, the telephones, telephone system, call center, and database, etc., of FIG. 2 are illustrated in a functional form and their actual physical manifestations may differ from implementation to implementation.

Figure 3:
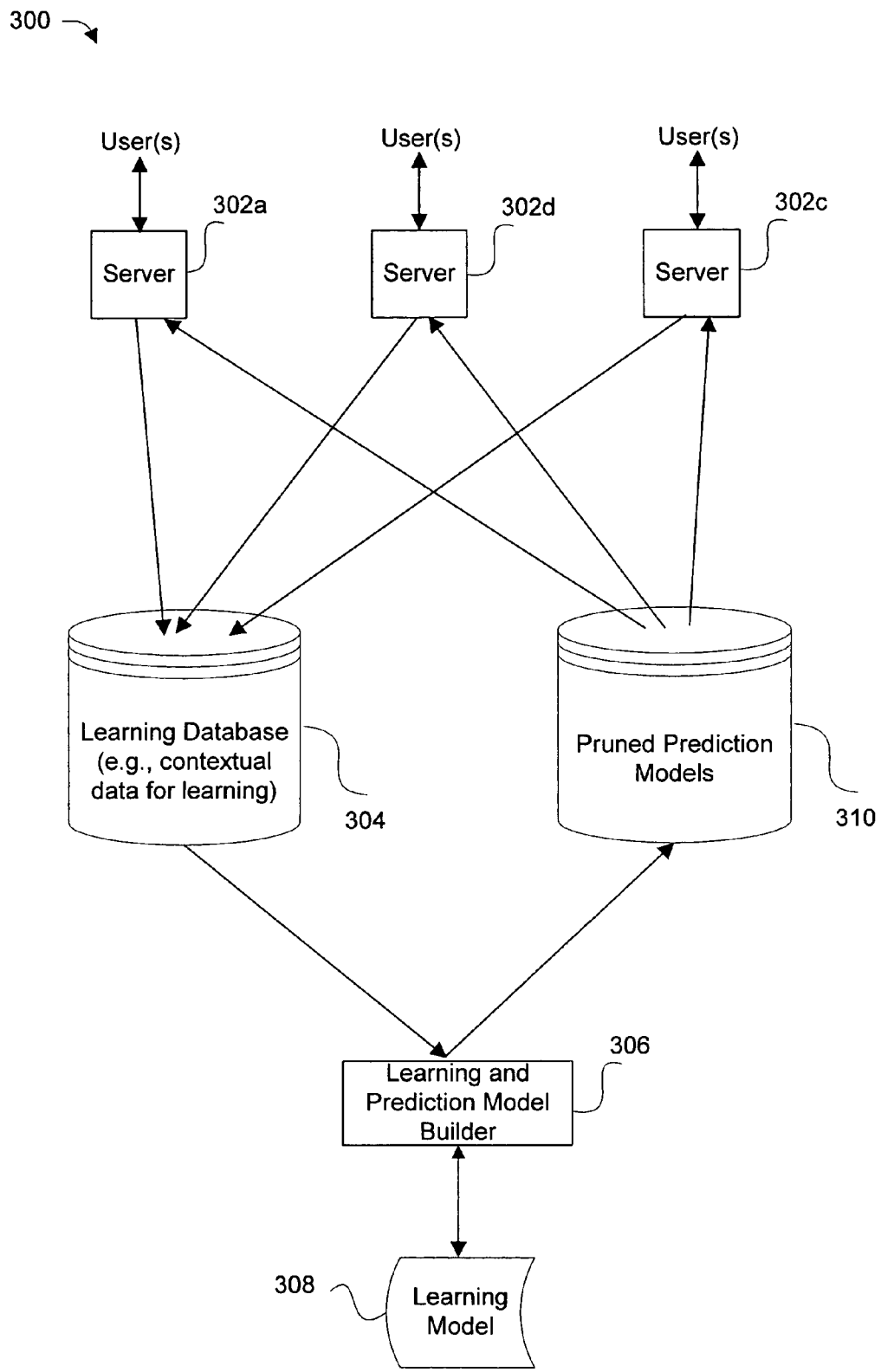
FIG. 3 is a diagram illustrating an exemplary distributed learning system in which techniques of the present invention may be implemented.

FIG. 3 is a diagram illustrating an exemplary distributed learning system 300 in which techniques of the present invention may be implemented. Of course, the present invention may be implemented in any suitable system that implements predictive modeling. As shown in FIG. 3, system 300 includes one or more interactive servers 302, a learning database 304, a prediction model repository 310, a learning and prediction model builder server 306, and a learning model 308. The learning system preferably includes a plurality of distributed interactive servers 302 although a single interactive server is also contemplated.

Interactive servers 302 execute one or more prediction models to determine specific transaction paths to follow, such as which web page or automated interactive voice message to present to a particular customer. A single prediction model may be used to predict the probability of a particular outcome or any number of outcomes based on a specific number of input attributes or contextual data and their corresponding values. Contextual data is in the form of a finite set of input factors which are deemed to have an effect on whether a particular goal or outcome is met when particular decisions or events occur. Input attributes may include attributes of a contacting entity (such as a potential or current customer), attributes of an answering entity (such as sales or service agent), time information regarding when specific events occur, etc. Alternatively, a plurality of prediction models may be used to determine the probability of a plurality of outcomes. Each single prediction model may be used to predict each single outcome probability. For example, a first prediction model may be used to determine the probabilities of achieving a first outcome when a particular decision (or action plan) is implemented with respect to various customer's with specific characteristics or profiles, and a second prediction model is used to determine the probabilities of achieving a second outcome when a particular decision (or action plan) is implemented with respect to various customer's with specific characteristics or profiles. In sum, any number of prediction models may be used to predict any number of outcomes under any number of different input attribute values.

The prediction models may be retrieved from (or sent by) one or more prediction models database 310. The interactive servers 302 also may be configured to collect contextual data regarding the input attributes used in the prediction model, as well as the results of the selected interaction or decision path. This contextual data is collected from one or more interactive servers 302 and stored in learning database 304.

Learning and prediction model builder 306 is generally configured to use the data from learning database 304 to update (the terms update, build, create, or modify are used interchangeably herein) one or more prediction models that are then sent to prediction model database 310. Additionally, model builder 306 may also prune one or more learning models 308 to generate one or more pruned prediction models, which are stored in prediction model database 310. A pruned prediction model is generally a learning model whose input attributes have been trimmed down to a subset of attributes (or attribute values) so as to be more efficient. That is, the pruned prediction model will typically have less input attributes to affect its results than the learning model from which it has been pruned. Pruned prediction models are used by the interactive servers 302 to formulate decisions or select particular interaction paths. Of course, pruning is not necessary for practicing the techniques of the present invention and the learning or prediction model may be used without trimming the input attributes. The builder 306 may also be configured to update the one or more learning models if necessary.

Figure 4:
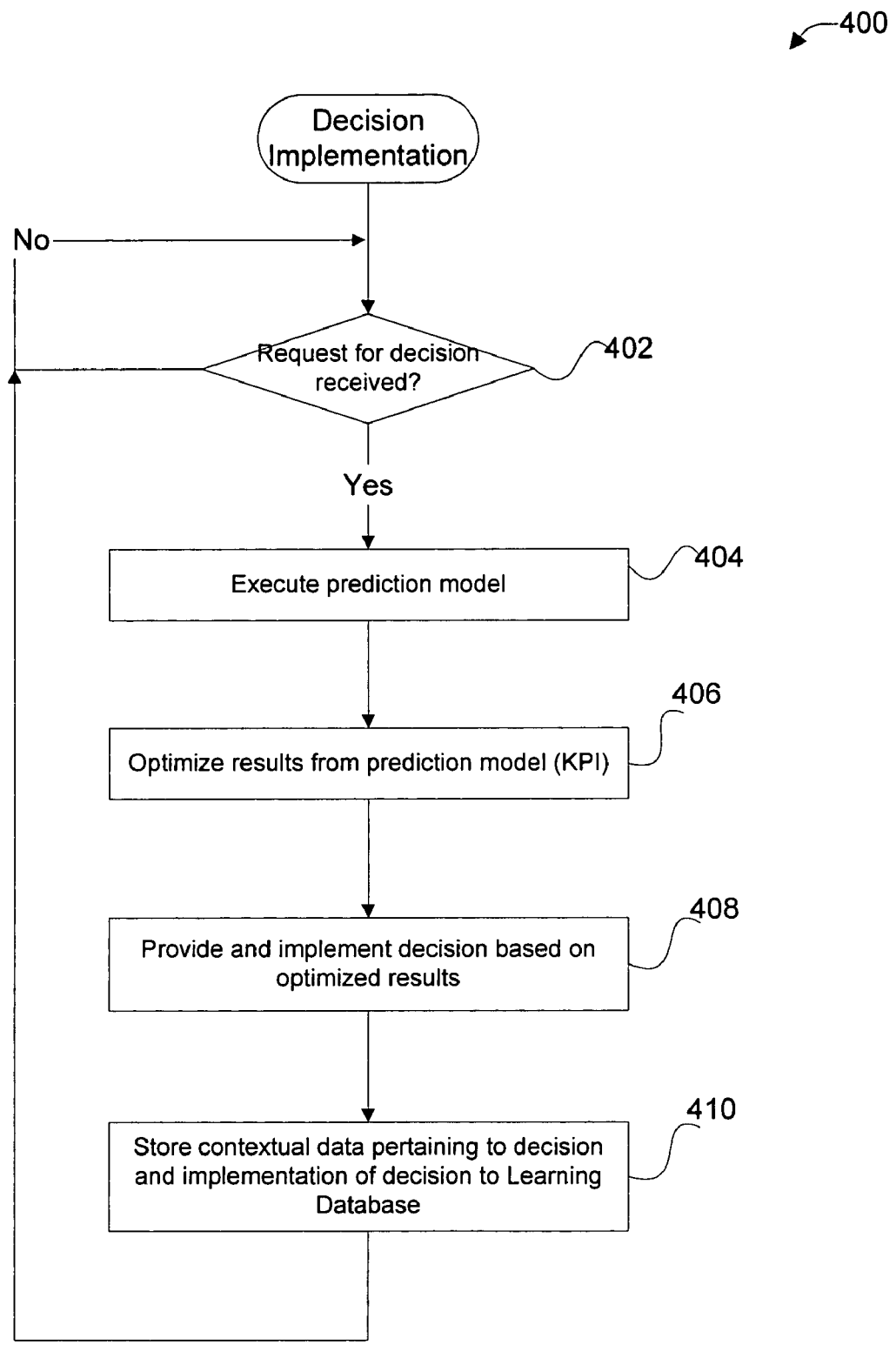
FIG. 4 is a flowchart illustrating a procedure for implementing a decision using an updated prediction model in accordance with one embodiment of the present invention.

FIG. 4 is a flowchart illustrating a procedure 400 for implementing a decision using a prediction model in accordance with one embodiment of the present invention. The following procedure represents merely one example of a flow in which the techniques of the present invention may be implemented. In the example of FIG. 3, this procedure 400 may be executed on any one of servers 302, for example. Initially, a request for a decision may be received at operation 402. For instance, a customer may access a particular website of a company or call a company's service telephone number. The automatic process that is automatically interacting with the customer may be making a request for a particular decision regarding which web page, automated voice interaction, or particular live sales agent is to be presented to the particular customer. The request may be received at any time during the customer interaction process, e.g., at any web page in a series of sequentially presented web pages or at the beginning or at any intermediary point of an IVR telephone call. The request may also be made by a person, rather than an automatic process. For example, a sales representative may be making requests via a graphical user interface while interacting with a customer through some form of computer data exchange, such as a chat session, or a via a telephone interaction.

One or more prediction models are then executed based on the contextual data or input attributes associated with the particular decision request in operation 404. In a sales type application, the prediction model may produce a probability value for each potential offer being accepted by the customer if such offer is presented to the customer. In one embodiment, the prediction model may also assign values for each of a plurality of key performance indicators ("KPI's") for each of the different decision choices (e.g., presentation of the different offers). In the sales offer example, the prediction model may output a value for a number of factors (or KPI's) that each correspond to how well a particular performance goal is expected to be met when each offer is presented. For instance, the performance goals may include both minimizing cost and maximizing revenue, as well as the probability of the offer being accepted if presented to the customer. In this example, the prediction model may determine that if a particular offer is presented it will result in $50 cost which is reflected in the "minimizing cost" KPI, an expected revenue increase of $90 for the "maximizing revenue" KPI, and a 27% value for the probability of acceptance KPI. A second offer may result in different KPI values if the second offer is presented.

Several suitable embodiments for generating a prediction model are further described in the above referenced, co-pending filed U.S. patent application Ser. No. 10/980,421, entitled "Method and Apparatus for Automatically and Continuously Pruning Prediction Models in Real Time Based on Data Mining", which application is incorporated herein by reference in its entirety for all purposes.

The KPI values for each decision (e.g., a particular offer is presented) may then be compared in an optimization operation 406. For example, it is determined which decision to implement based on the relative importance of the various KPI's of the decisions. Several suitable embodiments of optimization techniques are described in the above referenced, co-pending U.S. patent application Ser. No. 10/980,440, entitled "Method and Apparatus for Optimizing the Results Produced by a Prediction Model", which application is incorporated by reference herein in its entirety for all purposes.

The selected decision is then provided and implemented based on the optimized results in operation 408. For example, the selected offer is presented to the customer. The contextual data (e.g., input attributes and results of the decision) are then stored, for example, in the learning database 304 in operation 410. Any suitable input attributes that are likely to affect the outcome of the prediction model are retained. In the sales example, a customer's demographics, sales history, and specifics of their interactions with the sales center may be retained as contextual data. After the contextual data is stored, the decision implementation procedure 400 may then be repeated for the next decision request.

In general, the present invention includes techniques for computing expected values for reaching an end goal or end goal event, starting at an initial event of a series of possibly achieved events, using a prediction model when there is uncertainty. These techniques for computing expected values may be implemented in any suitable environment. That is, the decision making systems described above are merely exemplary and are not necessary to practicing the techniques of the present invention. Additionally, the decision making flow described above with respect to FIG. 4 is merely exemplary and the techniques of the present invention may be utilized in any other suitable process that utilizes expected values produced by a prediction model.

Figure 5:
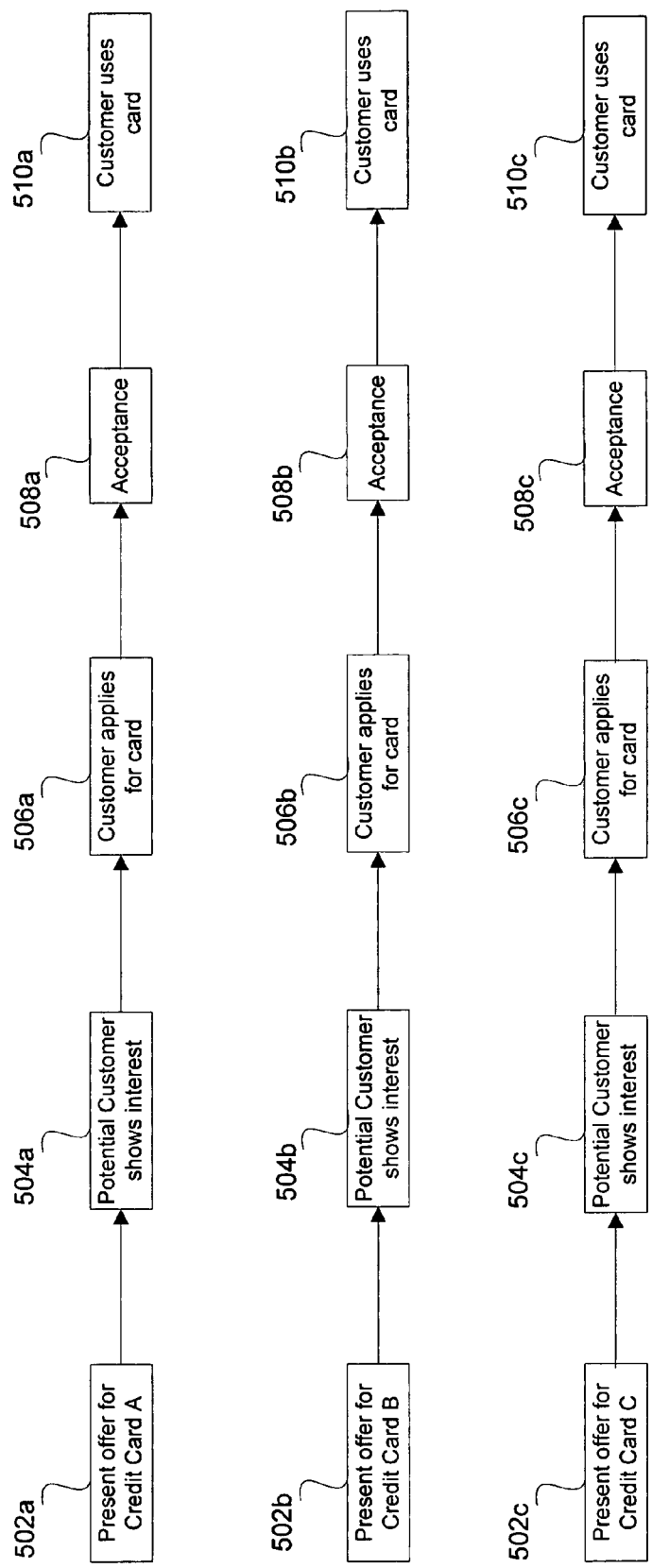
FIG. 5 illustrates exemplary event sequences for three different credit card offers in accordance with one embodiment of the present invention.

FIG. 5 illustrates exemplary event sequences for three different credit card offers in accordance with one example implementation of the present invention. Each of the three different credit cards A, B, and C has a set of events that may or may not occur with respect to a particular potential customer. As shown, card A is associated with event sequence 502a, 504a, 506a, 508a, and 510a. Likewise, card B is associated with event sequence 502b, 504b, 506b, 508b, and 510b. Also, card C is associated with event sequence 502c, 504c, 506c, 508c, and 510c.

In this example, each event sequence for each card has a series of events that may occur as a potential customer performs actions with respect to the corresponding card. Initially, the card may be presented to the potential customer in event 502. Next, the potential customer may express interest in the presented card in event 504. For instance, the customer may ask for an application from a sales agent or download an application form from a web site.

Next, the potential customer may actually apply for the card in step 506, e.g., send a completed application form to a sales center or submit the completed form at a web site. After the customer applies for the card, the next event may include acceptance of such application in step 508. For instance, a credit check may be executed for the applying customer to determine whether the customer is a reasonable credit risk. After the application is accepted, the last event in this sequence is the customer actually using his/her card in step 510.

The techniques of the present invention may be implemented for any suitable event sequence. The stereotypical event sequence is the sales process for a direct sales force approach where prospects get transformed into customers, going through stages. For example:

Prospect→Qualified→Proposal→Sold

Or a more complex one like:

Prospect→Interested→Inquired→Presented→Proposal→Approved→Sold→Closed

But event sequences may exist in much simpler sales processes. For example, in an informational web site a visitor may go through stages until becoming a paying subscriber. In this case the pipeline may look like:

Visitor→Registered→Subscriber

In an e-commerce web site the pipeline may be:

Visitor→Clicked→In-cart→Checkout→Sold

In a call center when cross selling the pipeline may look like:

Caller→Interested→Sold

Where there may be some time between "Interested" and "Sold".

What is in common for all these cases is that the customer is considered to be in a series of distinct states between the starting state and the end goal.

One or more prediction models can be designed to determine an expected value for reaching the last steps (e.g., "use probability value for a plurality of different credit cards") in one or more event sequences. Each prediction model generally tracks the relationships between the input attributes for various user entities and the results from implementing one or more decisions. The input attributes as well as the decisions are each a finite set. The input attributes are selected as possibly being relevant to affecting any of the prediction targets, such as predicting the probability of selling a red car to a specific type of customer. The prediction model will track what happens with respect to prediction targets when particular input attribute values are present and use this information to determine probabilities of achieving specific goals when specific input attribute values are present. Techniques for determining probability values for achieving specific goals under various input attribute conditions are well known to those skilled in the art. For example, several data mining techniques may be found in the textbook "Predictive Data Mining: A Practical Guide" by Sholom M. Weiss and Nitin Indurkhya, Published by Morgan Kaufinann (Aug. 1, 1997), ISBN: 1558604030, which textbook is incorporated herein by reference in its entirety for all purposes.

A prediction model keeps track of a plurality of counts of specific input attribute values (or combination of attribute values) for each of the prediction targets. For example, a count of the number of customers that are from California (one possible value of the "residential state" input attribute) who have purchased a red car (a particular prediction target) is retained. These counts are then used to predict probability of such goals being met under various input attribute conditions when the collected data is enough to render the predictions to be statistically significant. When there is not enough collected data, an estimated prediction is determined by techniques of the present invention. Additionally, the outcomes of the prediction model may change over time as more data is collected.

In general, the prediction model determines an expected value for reaching a particular end goal or end event and this expected value may be estimated when there is not enough data for the particular end event. An expected value may be any suitable parameter or end goal that may aid the process of determining what action to take. In the illustrated example of FIG. 5, the expected value for the "card use" step is a probability value for the potential customer using the card if presented with a particular offer, such as an offer for card A. Other types of expected values may also be determined, such as expected revenue, expected cost, expected level of customer satisfaction, expected number of customer returns, etc. for the current potential customer when she/he starts at the initial event (e.g., presentation of a credit card offer) and then reaches the end event, e.g., uses the particular credit card.

The expected value for the end event may alternatively be determined with reference to the potential customer being at any of the individual events. That is, a probability of "card use" may be determined for a potential customer that has reached the step of applying for a particular card (event 506).

Figure 6:
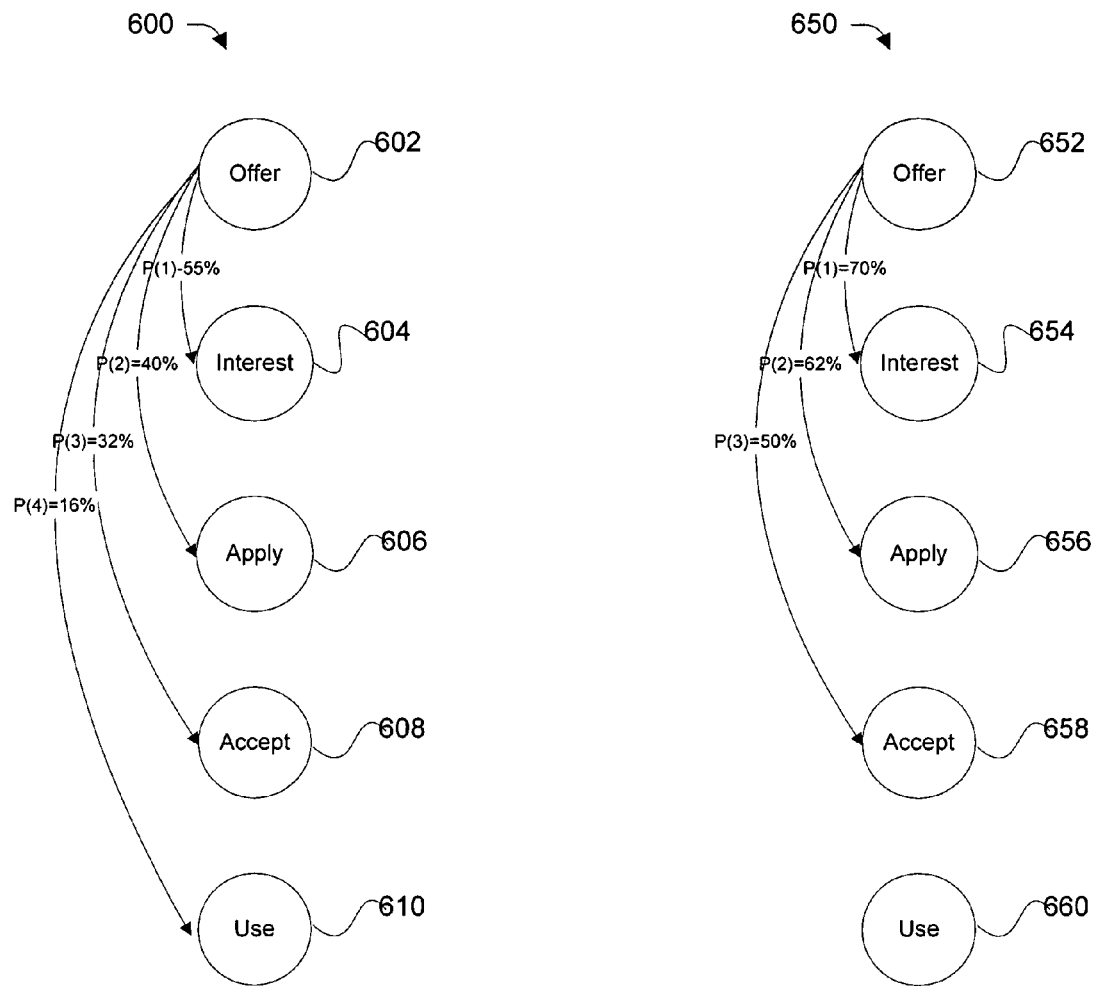
FIG. 6 illustrates a first event sequence for which a probability of reaching the last event is determinable and a second event sequence for which the probability for reaching the last event is not.

When enough contextual data has been collected on a large amount of different customer profiles (or different sets of input attributes) with some of the profiles being similar to the current profile, an expected value for reaching the end event may be determined with an acceptable statistical degree of certainty. For example, the degree of certainty is greater than a predetermined value, such as ±10% with 95% certainty (or degree of uncertainty is less than a predetermined value). For example, the prediction may have to be within 10% of the correct value and have at least a 95% certainty value. However, sometimes there is not enough data to determine the expected value for the end event. FIG. 6 illustrates a first event sequence 600 for which a probability of a potential customer going from the first to the last event is determinable and a second event sequence 650 for which the probability for going from the first to the last event is not. For instance, a particular customer who is presented with offer 602 has a probability of P(4) of going from the offer presentation to the last event of card use 610. In contrast, the probability of a particular customer moving from the offer event 652 to the last use event 660 of event sequence 650 is uncertain. That is, there is enough contextual data to determine P(4) for sequence 600, but not enough data to determine an end event probability for sequence 650.

However, for the event sequence 650 there is enough contextual data to determine the probability of reaching some of the intermediary events, such as the interest event 654, the apply event 656, and the accept event 658. In other words, the prediction model can determine expected values for only an initial set of events in the event sequence 650. In embodiments of the present invention, these determined expected values for an initial set of events in a particular event sequence may be used in conjunction with expected values for a final set of events which are determinable with a high degree of certainty for one or more other event sequences or other sets of input attributes to determine the final expected value for the particular uncertain event sequence. For example, the expected values of sequence 600 (which are determinable for the entire sequence) may be used with the determined expected values for sequence 650 to thereby determine the expected value for the last event of the sequence 650, e.g., the probability of moving from offer event 652 to use event 660. If the entire path for sequence 650 is completely uncertain, the determined expected values for sequence 600 may be used by itself. Additionally, the known sequence 600 may be compiled from a set of sequences, rather than a single sequence.

In sum, the prediction model is configured to predict the expected value of a last step of an uncertain sequence by optionally predicting an expected value for reaching one or more first steps of the uncertain event sequence and by predicting an expected value for reaching one or more last steps of one or more other event sequences and/or other less specific sets of input attributes. For example, the probability of reaching the last steps may be determined for another similar offer or set of offers and the same potential customer profile. Alternatively or additionally, the probability of reaching the last steps may be determined for all types of potential customer profiles, rather than for the current potential customer profile.

The potential customer's profile can be determined in a number of ways, including reading the "cookie" on a customer's computer system, looking up prior experience with this potential customer, noting how the customer reached the company's home page (e.g. through a Yahoo® search or a link from another web site), the time of day, etc. Prior experience with the potential customer may include information such as income, residential address, purchasing history, whether the potential customer owns a home or rents, account history, payment history, calls to support, tenure as a customer, number of transactions, prior offer acceptance patterns, etc. Any and all information legally obtainable about the customer can be used to create a user profile which can be used to determine the expected (or estimated) values as described herein.

Figure 7:
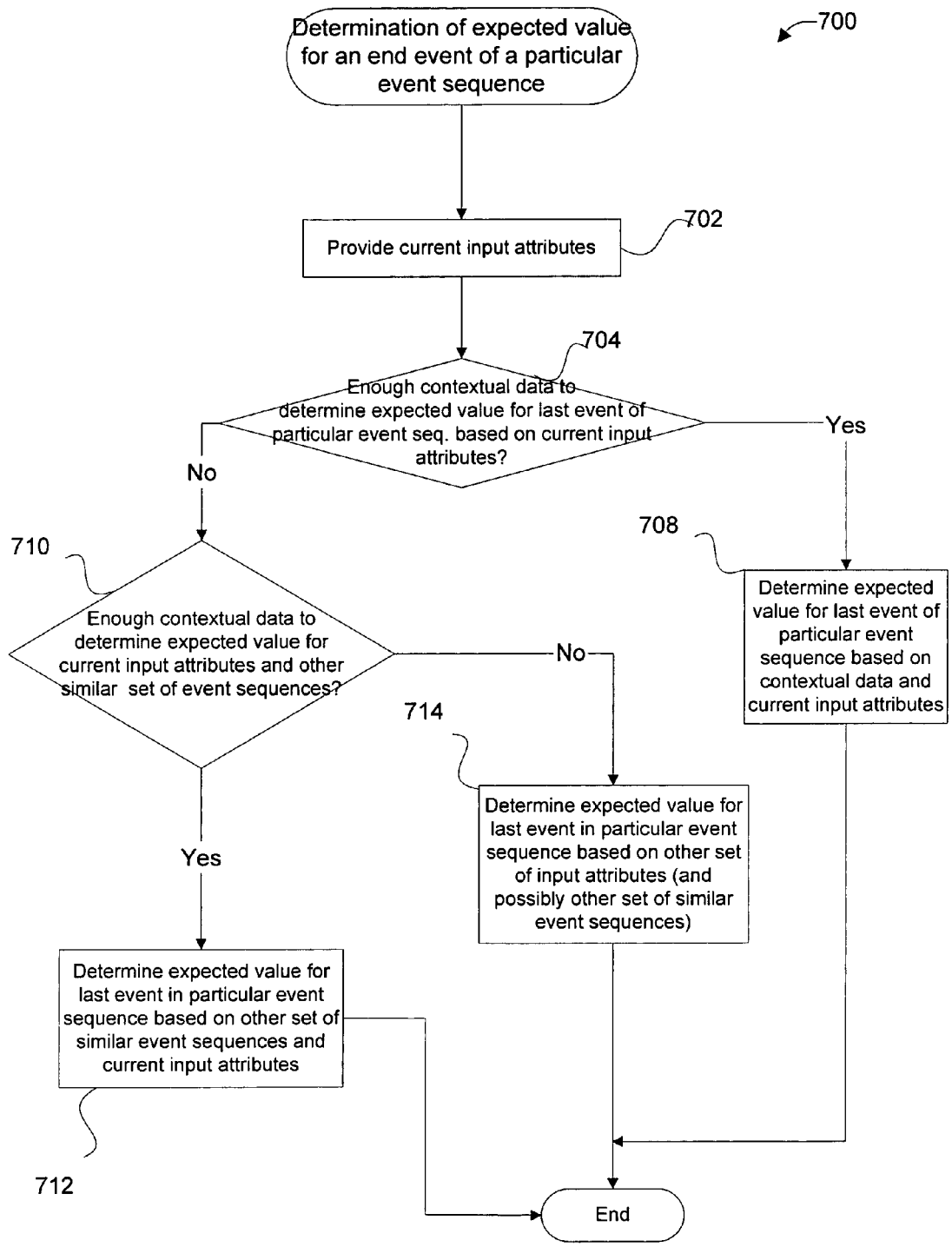
FIG. 7 is a flowchart illustrating a procedure for determining an expected value for reaching an end event of a particular sequence of events when there is uncertainty, in accordance with one implementation of the present invention.

FIG. 7 is a flowchart illustrating a procedure 700 for determining an expected value for reaching an end event of a particular sequence of events when there is uncertainty, in accordance with one implementation of the present invention. Although the procedure of FIG. 7 is illustrated as being used to determine a single event sequence's expected value for reaching an end event, this same process would typically be applied (in parallel or sequentially) to a number of event sequences, and these predictions would then be used to decide which action to perform with respect to a specific entity such as a potential customer.

As shown in FIG. 7 for a particular event sequence, current input attributes are provided in operation 702. It is then determined whether there is enough contextual data to determine an expected value for the last event of the particular event sequence based on the current input attributes in operation 704. If there is enough data, an expected value is then determined for the last event of the particular event sequence based on the contextual data and the current input attributes in operation 708. For example, the probability that a potential customer having a specific profile will use a specific credit card being offered is determined. The procedure then ends.

However, if there is not enough contextual data for determining the expected value of the end event of the particular event sequence simply based on the current input attributes, it is then determined whether the expected value can be determined based on the current input attributes and another similar set of event sequences in operation 710. For instance, the other event sequences used to determine the expected value are in the form of pipelines for using credit cards. This "other" similar set of event sequences may also include the current event sequence for which prediction by itself is uncertain. If the expected value can be determined based on the current set of input attributes and another one or more set of event sequences, the expected value is then determined for the last event in the particular event sequence based on the current input attributes and the other set of similar event sequences in operation 712. The procedure then ends.

For instance, the probability of the current potential customer using any card from a set of credit cards (when offers to such cards are presented) is determined. The probabilities for each step of the other set of sequences is also determined. As shown in FIG. 6, the sequence 600 and its associated event steps can be used to represent a set of credit card offers whose probabilities may be used to determine an uncertain sequence's end event probability. In contrast, sequence 650 represents a particular credit card offer that has one or more event steps whose expected values are uncertain for the particular current potential customer. In this example, the probabilities for a larger set of card offers may be determined for a specific customer profile (600), but is not determinable for a particular single credit card offer (650).

Any suitable technique may then be used to relate the known event sequence's determinable expected values to the uncertain event sequence's end event expect value. In one embodiment, the last step of the known probability sequence is divided by the second to the last step in the same known sequence to obtain a percentage jump value. In the example of FIG. 6, the percentage jump value between the last two events of the known sequence 600 is 50% or ½ ($^{16}/_{32}$). Other percentage jumps may also have to be determined, depending on the number of uncertain events in the uncertain sequence. The percentage jump value(s) between the certain events are then used to determine the percentage jump between the uncertain events. In FIG. 6, since the second to the last step probability is 50%, the last step probability may then be determined to be ½ of 50% or 25%. In cases where there are more than one uncertain probability, the known percentage jump values between the corresponding events of the known sequence may be likewise used to determine the uncertain probabilities.

Referring back to FIG. 7, if the expected value for another one or more other sets of event sequences cannot be determined for the current set of input attributes, the expected value for the last event in the current event sequence is determined based on a more general set of profiles (and possible other set of event sequences) in operation 714. For example, the probabilities for using the particular uncertain credit card may be determined for all of the profiles. The probability for the current profile may then be determined based on the determined event probabilities for the general set of profiles as described above for the other set of event sequences. The procedure then ends.

If there is not enough information to determine any expected values by any suitable set of data, the prediction model may simply output a message indicating that there is not yet enough information to determine the desired expected value (e.g., probability of the current customer using a particular credit card).

Embodiments of the present invention allow expected values to be determined for an event sequence in the presence of uncertainty. These estimated values are determined by calculating expected values for other event sequences and/or other sets of input attributes, which values have a higher degree of certainty. A first stage of the procedure for estimating an expected value may include using a wider range of event sequences for the specific set of current input attributes, such as the current customer profile. A second stage of the procedure may alternatively be applied when this first stage is determined to be uncertain. The second stage may include determining an expected value for a wider range of customer profiles and the same event sequence (or a set of other event sequences). This multiple stage process allows the estimated event sequence to more accurately be determined in a first phase and then more roughly determined in a second stage if there is not enough data for the first stage determination phase. In an alternative embodiment, if an event sequence is uncertain, then a broader set of event sequences and input attributes is used to estimate the uncertain event sequence's end expect value in a single phase process.

The present invention may employ various computer-implemented operations involving information stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms such as, producing, identifying, running, determining, comparing, executing, downloading, or detecting. It is sometimes convenient, principally for reasons of common usage, to refer to these electrical or magnetic signals as bits, values, elements, variables, characters, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 8:
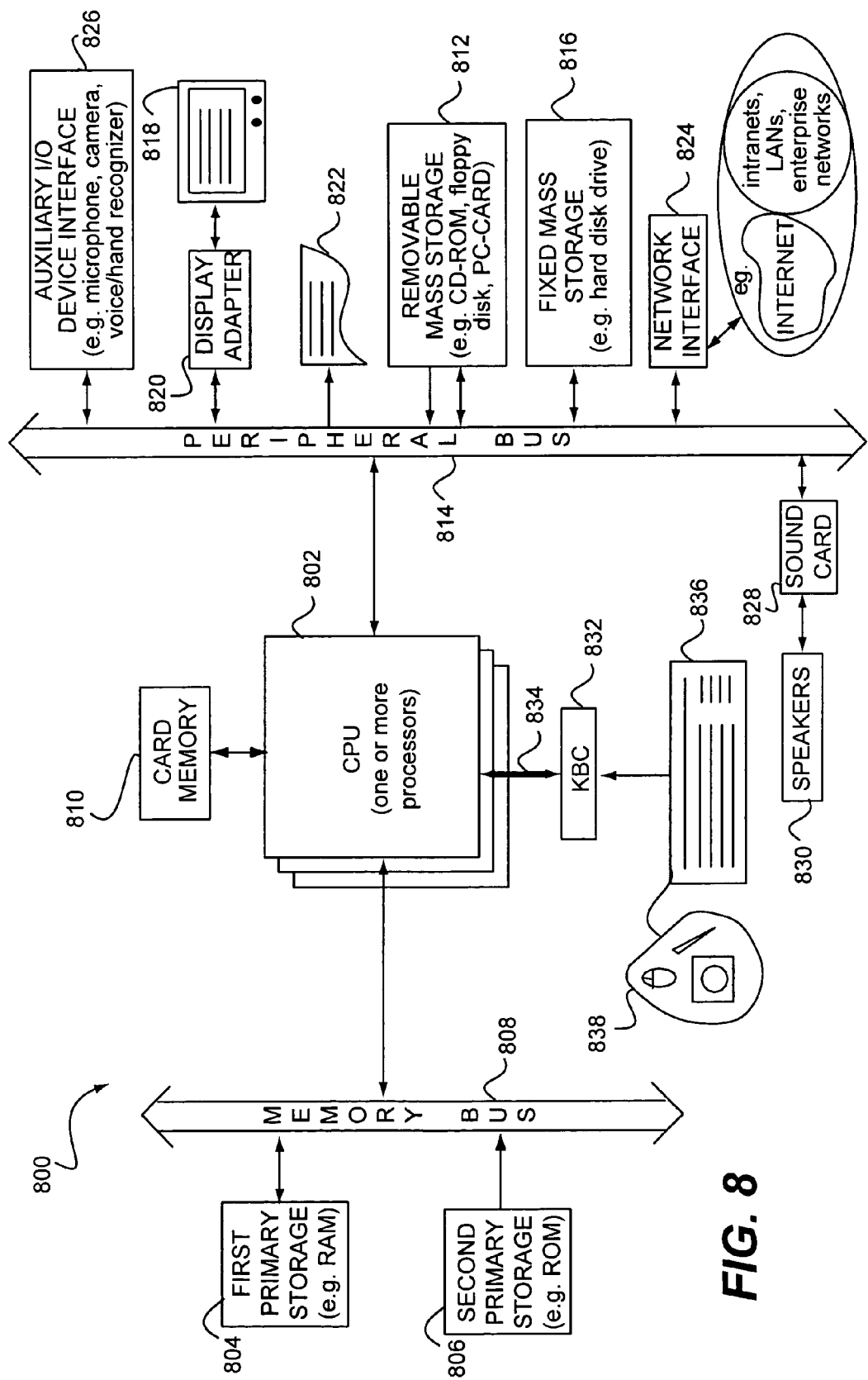
FIG. 8 is a block diagram of a general purpose computer system suitable for carrying out the processing in accordance with one embodiment of the present invention.

FIG. 8 is a block diagram of a general purpose computer system 800 suitable for carrying out the processing in accordance with one embodiment of the present invention. Other computer system architectures and configurations can be used for carrying out the processing of the present invention. Computer system 800, made up of various subsystems described below, includes at least one microprocessor subsystem (also referred to as a central processing unit, or CPU) 802. That is, CPU 802 can be implemented by a single-chip processor or by multiple processors. CPU 802 is a general purpose digital processor which controls the operation of the computer system 800. Using instructions retrieved from memory, the CPU 802 controls the reception and manipulation of input information, and the output and display of information on output devices.

CPU 802 is coupled bi-directionally with a first primary storage 804, typically a random access memory (RAM), and uni-directionally with a second primary storage area 806, typically a read-only memory (ROM), via a memory bus 808. As is well known in the art, primary storage 804 can be used as a general storage area and as scratch-pad memory, and can also be used to store input data and processed data. It can also store programming instructions and data, in addition to other data and instructions for processes operating on CPU 802, and is typically used for fast transfer of data and instructions bi-directionally over memory bus 808. Also, as is well known in the art, primary storage 806 typically includes basic operating instructions, program code, data and objects used by the CPU 802 to perform its functions. Primary storage devices 804 and 806 may include any suitable computer-readable storage media, described below, depending on whether, for example, data access needs to be bi-directional or uni-directional. CPU 802 can also directly and very rapidly retrieve and store frequently needed data in a cache memory 810.

A removable mass storage device 812 provides additional data storage capacity for the computer system 800, and is coupled either bi-directionally or uni-directionally to CPU 802 via a peripheral bus 814. For example, a specific removable mass storage device commonly known as a CD-ROM typically passes data uni-directionally to the CPU 802, whereas a floppy disk can pass data bi-directionally to the CPU 802. Storage 812 may also include computer-readable media such as magnetic tape, flash memory, Smart Cards, portable mass storage devices, and other storage devices. A fixed mass storage 816 also provides additional data storage capacity and is coupled bi-directionally to CPU 802 via peripheral bus 814. Generally, access to these media is slower than access to primary storages 804 and 806. Mass storage 812 and 816 generally store additional programming instructions, data, and the like that typically are not in active use by the CPU 802. It will be appreciated that the information retained within mass storage 812 and 816 may be incorporated, if needed, in standard fashion as part of primary storage 804 (e.g. RAM) as virtual memory.

In addition to providing CPU 802 access to storage subsystems, the peripheral bus 814 is used to provide access to other subsystems and devices as well. In the described embodiment, these include a display monitor 818 and adapter 820, a printer device 822, a network interface 824, an auxiliary input/output device interface 826, a sound card 828 and speakers 830, and other subsystems as needed.

The network interface 824 allows CPU 802 to be coupled to another computer, computer network, or telecommunications network using a network connection as referred to. Through the network interface 824, it is contemplated that the CPU 802 might receive information, e.g., objects, program instructions, or byte code instructions from a computer in another network, or might output information to a computer in another network in the course of performing the above-described method steps. Information, often represented as a sequence of instructions to be executed on a CPU, may be received from and outputted to another network. An interface card or similar device and appropriate software implemented by CPU 802 can be used to connect the computer system 800 to an external network and transfer data according to standard protocols. That is, method embodiments of the present invention may execute solely upon CPU 802, or may be performed across a network such as the Internet, intranet networks, or local area networks, in conjunction with a remote CPU that shares a portion of the processing. Additional mass storage devices (not shown) may also be connected to CPU 802 through network interface 824.

Auxiliary I/O device interface 826 represents general and customized interfaces that allow the CPU 802 to send and, more typically, receive data from other devices. Also coupled to the CPU 802 is a keyboard controller 832 via a local bus 834 for receiving input from a keyboard 836 or a pointer device 838, and sending decoded symbols from the keyboard 836 or pointer device 838 to the CPU 802. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. Examples of computer-readable media include, but are not limited to, all the media mentioned above, including hard disks, floppy disks, and specially configured hardware devices such as application-specific integrated circuits (ASICs) or programmable logic devices (PLDs).

It will be appreciated by those skilled in the art that the above described hardware and software elements are of standard design and construction. Other computer systems suitable for use with the invention may include additional or fewer subsystems. In addition, memory bus 808, peripheral bus 814, and local bus 834 are illustrative of any interconnection scheme serving to link the subsystems. For example, a local bus could be used to connect the CPU to fixed mass storage 816 and display adapter 820. The computer system referred to in FIG. 8 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For instance, the following claims often use the article "a" or "an" and use of such article does not limit the claim scope to a single element. Therefore, the described embodiments should be taken as illustrative and not restrictive, and the invention should not be limited to the details given herein but should be defined by the following claims and their full scope of equivalents.

What is claimed is:

1. A method in a computer system of selecting an event sequence to present to a user by predicting a likelihood of the user reaching an end event of each event sequence, the method comprising:

(a) providing a current set of input attributes and contextual data collected during performance of previous event sequences;

(b) determining a plurality of first expected values for going from a first event of a first event sequence to each of a plurality of subsequent events of the first event sequence based at least on the current set of input attributes and the collected contextual data, the plurality of subsequent events including a first end event, a probability of the user going from the first event to the first end event capable of being determined using the current set of input attributes and the collected contextual data;

(c) determining a second expected value for going from a first event of a second event sequence to a second end event of such second event sequence based on at least two of the expected values predicted for the first event sequence and based at least on the current set of input attributes and the collected contextual data, whereby the second expected value cannot otherwise be determined using only the current set of input attributes and the collected contextual data; and (d) presenting either the first or second event sequence to the user by comparing the predicted first expected value with the predicted second expected value and determining which of the first and second end events the user is more likely to reach if presented with the respective first or second event sequence, wherein the second expected value for reaching the second end event of the second event sequence cannot be determined with a degree of certainty that is higher than a predetermined value, wherein the first expected value for reaching the first end event of the first event sequence can be determined with a degree of certainty that is higher than the predetermined value, and wherein each of the first and second event sequences includes steps going from a first step of presenting one or more particular offers for a product and an end step of the user purchasing the offered product.

2. A method as recited in claim 1, further comprising:

(e) determining whether there is enough contextual data to predict the plurality of first expected values for the first event sequence based on the current set of input attributes and no other input attributes and based on the collected contextual data with a degree of certainty that is higher than a predetermined value or a degree of uncertainty that is lower than a predetermined value, and wherein determining the plurality of first expected values for the first event sequence is based on the current set of input attributes and no other input attributes when operation (e) is true, and wherein determining the plurality of first expected values for the first event sequence is based on other sets of input attributes from the collected contextual data when operation (e) is false.

3. A method as recited in claim 2, wherein the first and second expected values are probability values.

4. A method as recited in claim 3, wherein the first event sequence is a compilation of first event sequences that are similar to the second event sequence when operation (e) is true.

5. A method as recited in claim 4, wherein the first event sequence is equal to the second event sequence when operation (e) is false.

6. A method as recited in claim 3, wherein the other sets of input attributes are all of the input attributes from the collected contextual data.

7. A method as recited in claim 3, wherein operation (c) is performed by setting the second expected value for going from the first event to the end event of the second event sequence equal to a percentage jump between the last event and a second to the last event of the first event sequence multiplied by an expected value for a second to the last step of the second event sequence.

8. A method as recited in claim 3, wherein the current set of input attributes and the other sets of input attributes each are in the form of a profile of a potential customer.

9. A method as recited in claim 8, wherein the profile includes parameters selected from a group consisting of: prior experience with the potential customer, how the potential customer reached the company's home page, and the time of day.

10. A method as recited in claim 9, wherein the prior experience with the potential customer includes information selected from a group consisting of an income value or range, an age or age range, a gender, a residential address, purchasing history, whether the potential customer owns a home or rents, account history, payment history, calls to support, tenure as a customer, number of transactions, and prior offer acceptance patterns.

11. A computer system operable to select an event sequence to present to a user by predicting a likelihood of a user reaching an end event of each event sequence, the computer system including a processor and a memory device storing instructions that, when executed by the processor, cause the computer system to perform steps comprising:

(a) providing a current set of input attributes and contextual data collected during performance of previous event sequences;

(b) determining a plurality of first expected values for going from a first event of a first event sequence to each of a plurality of subsequent events of the first event sequence based at least on the current set of input attributes and the collected contextual data, the plurality of subsequent events including a first end event, a probability of the user going from the first event to the first end event capable of being determined using the current set of input attributes and the collected contextual data;

(c) determining a second expected value for going from a first event of a second event sequence to a second end event of such second event sequence based on at least two of the expected values predicted for the first event sequence and based at least on the current set of input attributes and the collected contextual data, whereby the second expected value cannot otherwise be determined using only the current set of input attributes and the collected contextual data; and (d) presenting either the first or second event sequence to the user by comparing the predicted first expected value with the predicted second expected value and determining which of the first and second end events the user is more likely to reach if presented with the respective first or second event sequence, wherein the second expected value for reaching the second end event of the second event sequence cannot be determined with a degree of certainty that is higher than a predetermined value, wherein the first expected value for reaching the first end event of the first event sequence can be determined with a degree of certainty that is higher than the predetermined value, and wherein each of the event sequences includes steps going from a first step of presenting one or more particular offers for a product and an end step of the user purchasing the offered product.

12. A computer system as recited in claim 11, further comprising instructions that, when executed by the processor, cause the computer system to perform steps comprising:

(e) determining whether there is enough contextual data to predict the plurality of first expected values for the first event sequence based on the current set of input attributes and no other input attributes and based on the collected contextual data with a degree of certainty that is higher than a predetermined value or a degree of uncertainty that is lower than a predetermined value, and wherein determining the plurality of first expected values for the first event sequence is based on the current set of input attributes and no other input attributes when operation (e) is true, and wherein determining the plurality of first expected values for the first event sequence is based on other sets of input attributes from the collected contextual data when operation (e) is false.

13. A computer system as recited in claim 12, wherein the first and second expected values are probability values.

14. A computer system as recited in claim 13, wherein the first event sequence is a compilation of first event sequences that are similar to the second event sequence when operation (e) is true.

15. A computer system as recited in claim 14, wherein the first event sequence is equal to the second event sequence when operation (e) is false.

16. A computer system as recited in claim 13, wherein the other sets of input attributes are all of the input attributes from the collected contextual data.

17. A computer system as recited in claim 13, wherein operation (c) is performed by setting the second expected value for going from the first event to the end event of the second event sequence equal to a percentage jump between the last event and a second to the last event of the first event sequence multiplied by an expected value for a second to the last step of the second event sequence.

18. A computer system as recited in claim 13, wherein the current set of input attributes and the other sets of input attributes each are in the form of a profile of a potential customer.

19. A computer system as recited in claim 18, wherein the profile includes parameters selected from a group consisting of: prior experience with the potential customer, how the potential customer reached the company's home page, and the time of day.

20. A computer system as recited in claim 19, wherein the prior experience with the potential customer includes information selected from a group consisting of an income value or range, an age or age range, a gender, a residential address, purchasing history, whether the potential customer owns a home or rents, account history, payment history, calls to support, tenure as a customer, number of transactions, and prior offer acceptance patterns.

21. A computer program product embedded in a memory device for predicting an expected value associated with an end event of an event sequence, the computer program product including instructions that, when executed by a processor, cause the processor to perform steps comprising:
(a) providing a current set of input attributes and contextual data collected during performance of previous event sequences;
(b) determining a plurality of first expected values for going from a first event of a first event sequence to each of a plurality of subsequent events of the first event sequence based at least on the current set of input attributes and the collected contextual data, the plurality of subsequent events including a first end event, a probability of the user going from the first event to the first end event capable of being determined using the current set of input attributes and the collected contextual data;
(c) determining a second expected value for going from a first event of a second event sequence to a second end event of such second event sequence based on at least two of the expected values predicted for the first event sequence and based at least on the current set of input attributes and the collected contextual data, whereby the second expected value cannot otherwise be determined using only the current set of input attributes and the collected contextual data;
(d) presenting either the first or second event sequence to the user by comparing the predicted first expected value with the predicted second expected value and determining which of the first and second end events the user is more likely to reach if presented with the respective first or second event sequence, wherein the second expected value for reaching the second end event of the second event sequence cannot be determined with a degree of certainty that is higher than a predetermined value, wherein the first expected value for reaching the first end event of the first event sequence can be determined with a degree of certainty that is higher than the predetermined value, and wherein each of the event sequences includes steps going from a first step of presenting one or more particular offers for a product and an end step of the user purchasing the offered product.

22. A computer program product as recited in claim 21, wherein the computer program instructions, when executed by a processor, further cause the processor to perform steps comprising:
(e) determining whether there is enough contextual data to predict the plurality of first expected values for the first event sequence based on the current set of input attributes and no other input attributes and based on the collected contextual data with a degree of certainty that is higher than a predetermined value or a degree of uncertainty that is lower than a predetermined value, and
wherein determining the plurality of first expected values for the first event sequence is based on the current set of input attributes and no other input attributes when operation (e) is true, and
wherein the plurality of expected values for the event sequence is based on other sets of input attributes from the collected contextual data when operation (e) is false.

23. A computer program product as recited in claim 22, wherein the first and second expected values are probability values.

24. A computer program product as recited in claim 23, wherein the first event sequence is a compilation of first event sequences that are similar to the second event sequence when operation (e) is true.

25. A computer program product as recited in claim 24, wherein the first event sequence is equal to the second event sequence when operation (e) is false.

26. A computer program product as recited in claim 23, wherein the other sets of input attributes are all of the input attributes from the collected contextual data.

27. A computer program product as recited in claim 23, wherein operation (c) is performed by setting the second expected value for going from the first event to the end event of the second event sequence equal to a percentage jump between the last event and a second to the last event of the first event sequence multiplied by an expected value for a second to the last step of the second event sequence.

28. A computer program product as recited in claim 23, wherein the current set of input attributes and the other sets of input attributes each are in the form of a profile of a potential customer.

29. A computer program product as recited in claim 28, wherein the profile includes parameters selected from a group consisting of: prior experience with the potential customer, how the potential customer reached the company's home page, and the time of day.

30. A computer program product as recited in claim 29, wherein the prior experience with the potential customer includes information selected from a group consisting of an income value or range, an age or age range, a gender, a residential address, purchasing history, whether the potential customer owns a home or rents, account history, payment history, calls to support, tenure as a customer, number of transactions, and prior offer acceptance patterns.

31. An apparatus for selecting an event sequence to present to a user by predicting a likelihood of the user reaching an end event of each event sequence, comprising:

means for providing a current set of input attributes and contextual data collected during performance of previous event sequences;

means for determining a plurality of first expected values for going from a first event of a first event sequence to each of a plurality of subsequent events of the first event sequence based at least on the current set of input attributes and the collected contextual data, the plurality of subsequent events including a first end event, a probability of the user going from the first event to the first end event capable of being determined using the current set of input attributes and the collected contextual data;

means for determining a second expected value for going from a first event of a second event sequence to a second end event of such second event sequence based on at least two of the expected values predicted for the first event sequence and based at least on the current set of input attributes and the collected contextual data, whereby the second expected value cannot otherwise be determined using only the current set of input attributes and the collected contextual data; and means for presenting either the first or second event sequence to the user by comparing the predicted first expected value with the predicted second expected value and determining which of the first and second end events the user is more likely to reach if presented with the respective first or second event sequence, wherein the second expected value for reaching the second end event of the second event sequence cannot be determined with a degree of certainty that is higher than a predetermined value, wherein the first expected value for reaching the first end event of the first event sequence can be determined with a degree of certainty that is higher than the predetermined value, and wherein each of the first and second event sequences includes steps going from a first step of presenting one or more particular offers for a product and an end step of the user purchasing the offered product.

* * * * *

UNITED STATES PATENT AND TRADEMARK OFFICE
CERTIFICATE OF CORRECTION

PATENT NO. : 7,464,008 B2 Page 1 of 1
APPLICATION NO. : 11/000570
DATED : December 9, 2008
INVENTOR(S) : Adar et al.

It is certified that error appears in the above-identified patent and that said Letters Patent is hereby corrected as shown below:

In column 1, line 20, delete "10/980,440entitled" and insert -- 10/980,440, entitled --, therefor.

In column 8, line 65, delete "Kaufinann" and insert -- Kaufmann --, therefor.

In column 18, line 28, in claim 22, after "wherein" insert -- determining --.

In column 18, line 28, in claim 22, after "of" insert -- first --.

In column 18, line 28, in claim 22, before "event" insert -- first --.

Signed and Sealed this

Twentieth Day of April, 2010

David J. Kappos
*Director of the United States Patent and Trademark Office*